United States Patent Office 3,072,607
Patented Jan. 8, 1963

3,072,607
HARDENABLE COMPOSITIONS COMPRISING EPOXIDE COMPOUNDS AND CYCLIC ETHERS OR THIOETHERS
Willy Fisch, Binningen, Paul Zuppinger, Arlesheim, and Hans Brueschweiler, Basel, Switzerland, assignors to Ciba Limited, Basel, Switzerland
No Drawing. Filed Mar. 31, 1959, Ser. No. 803,072
Claims priority, application Switzerland Apr. 3, 1958
7 Claims. (Cl. 260—47)

It is known to polymerize tetrahydrofurane alone in the presence of a Friedel-Crafts catalyst or boron trifluoride. However, it is stated in Publication Board Report No. 717, page 1060, that it has not been possible to polymerize derivatives of tetrahydrofurane.

The present invention is based on the unexpected observation that compounds which contain at least two furane or thiophene radicals in the molecule, and the corresponding compounds hydrogenated in the furane or thiophene nucleus, can be reacted with epoxide resins in the presence of a Friedel-Crafts catalyst or a metal fluoborate or boron trifluoride.

Accordingly, the invention provides hardenable compositions which comprise (1) an epoxide compound which contains $n$ epoxide groups calculated on the average molecular weight, $n$ being a whole number or a fractional number greater than 1, (2) a cyclic ether or thioether which contains at least two monovalent radicals of the formula

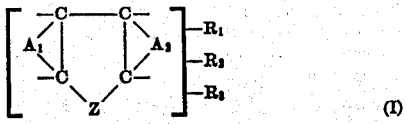

in which $R_1$, $R_2$ and $R_3$, each represent a hydrogen atom or a monovalent substituent, more especially an aliphatic, cycloaliphatic, araliphatic or aromatic radical, or $R_1$ and $R_2$ together and/or $R_3$ are together members of a cyclic system, $A_1$ and $A_2$ each represent two hydrogen atoms or monovalent substituents or a carbon-to-carbon bond, and Z represents an oxygen or sulfur atom, and (3) a Friedel-Crafts catalyst or a metal fluoborate or boron trifluoride.

The invention also provides a process for the manufacture of hardened resins, wherein an epoxide compound which contains $n$ epoxide groups calculated on the average molecular weight, $n$ being a whole or fractional number greater than 1, is reacted with a cyclic ether or thioether as defined above in the presence of a Friedel-Crafts catalyst or a metal fluoborate or boron trifluoride.

The epoxide compounds used in the invention have a 1:2-epoxy equivalency greater than 1.0. By the epoxy-equivalency reference is made to the average number of 1:2-epoxy groups

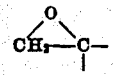

contained in the average molecule of the epoxide compound. Owing to the usual methods of preparation of the epoxide compounds and the fact that they are ordinarily a mixture of chemical compounds having somewhat different molecular weights and contain some compounds wherein the terminal epoxy groups are in hydrated form, the epoxy equivalency of polyepoxy compounds is not necessarily an integer of at least 2, but in all cases it is a value greater than 1.0.

As epoxide compounds of the kind defined above, which are to be reacted with the cyclic ethers or thio-ethers defined above there may be mentioned, for example, epoxidated diolefines, dienes or cyclic dienes, such as butadiene dioxide, 1:2:5:6-diepoxy-hexane and 1:2:4:5-diepoxy-cyclohexane; epoxidated diolefinically unsaturated carboxylic acid esters, such as methyl-9:10:12:13-diepoxystearate; the dimethyl ester of 6:7:10:11-diepoxy-hexadecane-1:16-dicarboxylic acid, epoxidated compounds containing two cyclohexenyl radicals, such as diethylene glycol bis-(3:4-epoxy-cyclohexane-carboxylate) and 3:4-epoxy-cyclohexyl-methyl-3:4-epoxy-cyclohexane carboxylate. Furthermore basic polyepoxide compounds, such as are obtained by the reaction of a primary or secondary aromatic amine, such as aniline or 4:4′di-(monomethylamino)-diphenylmethane, with epichlorhydrin in the presence of an alkali.

There may also be used polyglycidyl esters, such as are obtainable by the reaction of a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid and especially aromatic dicarboxylic acids, such as phthalic acid, isophthalic acid, terephthalic acid, 2:6 naphthylene-dicarboxylic acid, diphenyl-ortho:ortho′-dicarboxylic acid, ethylene glycol-bis-(para-carboxyphenyl) ether or the like. There may be mentioned, for example, diglycidyl adipate and diglycidyl phthalate and also diglycidyl esters which correspond to the average formula

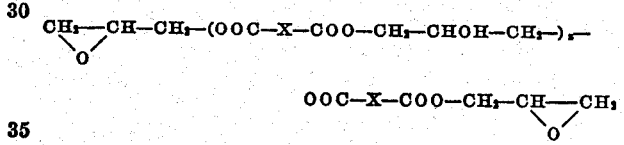

in which X represents an aromatic hydrocarbon radical, such as phenyl group, and Z represents a whole or fractional small number.

There may also be used polyglycidyl ethers such as are obtainable by the etherification of a dihydric or polyhydric alcohol or diphenol or polyphenol with epichlorhydrin or dichlorhydrin in the presence of an alkali. These compounds may be derived from glycols, such as ethylene glycol, diethylene glycol, triethylene glycol, propylene glycol-(1:2), propylene glycol-1:3-, butylene glycol-(1:4), pentane-diol-(1:5), hexane-diol-1:6), hexane-triol-(2:4:6) or glycerine, and especially from diphenols or polyphenols; phenol novolacs, cre-sol novolacs, resorcinol, pyrocatechol, hydroquinone, 1:4-dihydroxy-naphthalene, phenol-formaldehyde condensation products, bis-(4-hydroxyphenyl)-methane, bis-(4-hydroxyphenyl)-methylphenyl-methane, bis-(4-hydroxyphenyl)-tolyl-methane, 4:4′-dihydroxydiphenyl, bis-(4-hydroxyphenyl)-sulfone and especially 2:2-bis-(4-hydroxyphenyl)-propane. There may be mentioned, for example, ethylene glycol diglycidyl ether and resorcinol diglycidyl ether and also diglycidyl ethers which correspond to the average formula

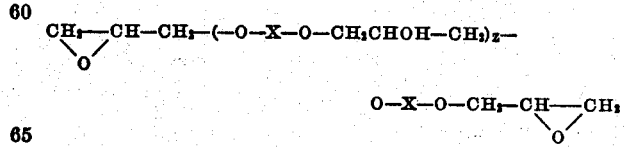

in which X represents an aromatic radical, and Z represents a whole or fractional small number.

There are especially suitable eqoxy-resins that are liquid at room temperature, for example, those of 4:4′-dihydroxydiphenyl-dimethylmethane which have an epoxide content of about 3.8 to 5.8 epoxide equivalents per kilogram. Such epoxy-resins correspond, for example, to the average formula

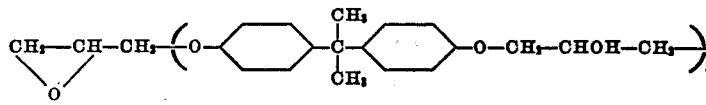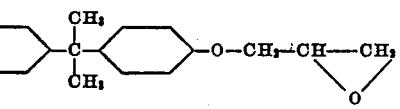

in which Z represents a whole or fractional small number, for example, between 0 and 2.

Alternatively, solid epoxy-resins may be used in the molten state or in solution.

As cyclic ethers or thioethers defined above, there are advantageously used those containing two monovalent radicals of the Formula I, and which correspond to the formula (II)
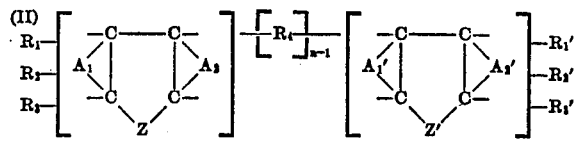

in which $R_1$, $R_1'$, $R_2$, $R_2'$, $R_3$ and $R_3'$ each represent a hydrogen atom or a monovalent substituent, more especially an aliphatic, cycloaliphatic, araliphatic or aromatic radical, and $R_4$ represents a divalent substituent, advantageously a divalent aliphatic, cycloaliphatic, araliphatic of aromatic substituent, or $R_1$ and $R_2$ or $R_1'$ and $R_2'$ or $R_3$ and $R_3'$ are together members of a cyclic system, $A_1$, $A_1'$, $A_2$ and $A_2'$ each represent two hydrogen atoms or monovalent substituents or a carbon-to-carbon, Z and Z' each represent an oxygen and/or sulfur atom, and $n$ is the whole number 1 or 2.

As such cyclic ethers or thioethers there may be mentioned derivatives of thiophene, tetrahydrothiophene, furane, dihydrofurane and especially of tetrahydrofurane.

As radicals $R_1$, $R_1'$, $R_2$, $R_2'$ and $R_3$ and $R_3'$ in Formula I or II there may be mentioned, apart from hydrogen atoms, monovalent substituents, for example, a halogen atom, a hydroxyl group, a nitro group or especially an aliphatic, cycloaliphatic, araliphatic or aromatic radical which is substituted by a functional group or interrupted by a heteroatom. When $A_1$ or $A_1'$ and/or $A_2$ or $A_2'$ represents substituents, their meaning is the same as that of $R_1$, $R_2$, $R_3$ or $R_4$. The divalent substituent $R_4$ in the Formula II is advantageously a divalent aliphatic, cycloaliphatic, araliphatic or aromatic radical, which may be substituted by a functional group or may be interrupted by a hetero atom.

Among the derivatives of thiophene and furane there may be mentioned: Polyesters and especially diesters of α-thenyl alcohol or furfuryl alcohol with di- or polycarboxylic acids, such as oxalic acid, malonic acid, succinic acid, glutaric acid, adipic acid, sebacic acid, citric acid, maleic acid, dichloromaleic acid, fumaric acid, phthal acid, terephthalic acid, endomethylene-tetrahydrophthalic acid, naphthalene dicarboxylic acid; formals, acetals or ketals of α-thenyl alcohol or furfuryl alcohol with aldehydes or ketones, such as formaldehyde, acetaldehyde, acetone or cyclohexanone; polyethers and especially diethers of α-thenyl alcohol or furfuryl alcohol with divalent or polyvalent alcohols, such as ethylene glycol, diethylene glycol or glycerine; diesters or polyesters of thiophene-2-carboxylic acid or furane-2-carboxylic acid with the aforesaid divalent or polyvalent alcohols; and also polycondensation products of phenols with furfurol, and polycondensates obtained by the acid autocondensation of furfuryl alcohol; coumarone or coumarone-indene resins. Finally compounds as difurfuryl, difurfuryl-acetone, difurfuryl-cyclohexanone, difurfuryl ether or 1:5-difurfuryl-pentane.

Among the preferred derivatives of tetrahydrofurane there may be mentioned, for example, polyesters and more especially di-esters of tetrahydrofurfuryl alcohol with the above-mentioned di- or poly-carboxylic acids, such as ditetrahydrofurfuryl maleate, ditetrahydrofurfuryl succinate, ditetrahydrofurfuryl phthalate; polyethers and more especially diethers of tetrahydrofurfuryl alcohol with dihydric or polyhydric alcohols, such as ethylene glycol, diethylene glycol, glycerine; and also formals, acetals or ketals of tetrahydrofurfuryl alcohol with aldehydes or ketones, such as ditetrahydrofurfuryl formal. There may also be mentioned ditetrahydrofurfuryl compounds obtained by hydrogenating condensation products of 2 molecular proportions of furfural with 1 molecular proportion of a ketone having two —$CH_2$-groups in α-position to the keto group, such, for example, as 2:6-ditetrahydrofurfuryl cyclohexanol-(1).

As Friedel-Crafts catalysts may be mentioned aluminum trichloride, ferric chloride, zinc chloride, antimony trichloride and tin tetra chloride, and as metal fluoborates the fluoborate of zinc, lead, iron, nickel, copper, cobalt, magnesium, cadmium, mercury, calcium, strontium, barium or aluminum. The following catalysts are preferably used: boron trifluoride, tin tetrachloride, antimony pentachloride, and the fluoborates of zinc, tin, lead, iron or nickel. These catalysts can be incorporated with the compositions as such, or they may first be converted into their complexes.

Suitable substances capable of forming complexes are water, alcohols, ethers, ketones, carboxylic acids, carboxylic acid anhydrides, amines, amides, sulfides or the like. There may be used, for example, as a complex-forming compound a cyclic ether or thioether of Formula I, or another cyclic ether or thioether, such as tetrahydrofurane or tetrahydrofurfuryl alcohol. In this case the complex is formed by simple dissolution of the Friedel-Crafts catalyst or boron trifluoride in an excess of the cyclic ether or thioether.

Boron trifluoride is advantageously used in the form of a stable complex thereof with water or a nitrogenous base. For example, a stable complex with water or a nitrogenous base may first be formed, and the resulting complex then diluted with or dissolved in the cyclic ether, whereby a stable non-polymerizing solution is obtained, which is mixed with the epoxide compound shortly prior to use. Alternatively, the boron trifluoride may first be dissolved in a quantity of the cyclic ether or thioether in excess of the stoichiometric quantity needed to form the complex, the ether or thioether containing the necessary small proportion of the nitrogenous base or water, for example, at least 1%, and advantageously 2 to 5% of water, calculated from the ether or thioether. The presence of such compounds capable of forming complexes retards the speed of hardening, and this may be desirable in some cases.

As such moderators may be used nitrogen bases capable of forming stable complexes with boron trifluoride, for example, ammonia, ethylamine, ethylene diamine, monoethanolamine, piperidine, triethanolamine, urea, hexamethylene tetramine, trimethylamine or pyridine, and more especially aromatic amines, such as aniline, toluidine and Schiff's bases of such amines. As moderator there is preferably used either a Schiff's base of aromatic amines, for example, the Schiff's base of aniline with benzaldehyde, or water, togther with boron trifluoride. For example, boron trifluoride and water form stable, liquid hydrates such as $BF_3.H_2O$ and $BF_3.2H_2O$. When water is used as moderator the hardening proceeds exothermically at room temperature. When a Schiff's base of an aromatic amine with an aromatic aldehyde is used, hardening generally proceeds exothermically only when external heat is applied, for example, after short heating to about 60° C., and hardening occurs at room temperature only after long standing and without any detectable evolution of heat. In addition to retarding the reaction, the presence of a small amount of water suppresses the harmful coagulation, which occasionally occurs when the epoxide compound is mixed with an anhydrous solution of boron trifluoride in the cyclic ether or thioether, and leads to non-homogeneous hardening. It may therefore be of advantage to use water and nitrogenous base jointly as moderators.

The relative proportions of the epoxide compound and the ether or thioether as defined above vary within wide limits. For certain uses the proportion of the cyclic ether or thioether may be small and of the order of magnitude necessary for the formation of a relatively stable complex with the Friedel-Crafts catalyst or with the boron trifluoride. In the case of boron trifluoride, for example, this generally corresponds to an excess amounting to about ten times the stoichiometric quantity amount of ether or thioether needed for complex formation. Experiments have shown that it is of advantage to use, for example, at least 5 parts of a solution of 10% strength of boron trifluoride for every 100 parts of a polyglycidyl ether of 4:4'-dihydroxydiphenyl-dimethylmethane containing 4.03 epoxide equivalents per kg., that is to say, 1.25 grams of boron trifluoride per gram equivalent of epoxide groups.

In an advantageous form of the invention a larger proportion of the substituent cyclic ether or thioether is used, so that the ratio of the epoxide compound to cyclic ether or thioether is about 100:5–100, and preferably 100:20–50. It is also of advantage to use not more than 1 mol of the cyclic polyether or thioether for each epoxide equivalent of the epoxide compound.

When boron trifluoride and water are used jointly it is of advantage to use at least about 0.2, and preferably 0.5 to 3 parts by weight of water for each part by weight of boron trifluoride.

The hardenable composition of the invention may also contain suitable plasticizers or inert fillers. When a plasticizer such as dibutyl phthalate, dioctyl phthalate, tricresyl phosphate or triphenyl phosphite is added, softer, elastic and flexible hardened masses are obtained.

It may also be of advantage, depending on the properties described in the polymerized resin to add an active diluent or modifier which under the action of the Friedel-Crafts catalyst or boron trifluoride reacts with the epoxide resin and participates in the hardening reaction, for example, an ethylenically unsaturated polymerizable compound such as styrene, a monoepoxy compound such as cresyl glycide; other cyclic ethers such as tetrahydrofurane or tetrahydrofurfuryl alcohol; furthermore, there may be incorporated under the influence of the Friedel-Crafts catalyst or boron trifluoride mono-functional or preferably poly-functional compounds that contain hydroxyl groups, keto, aldehyde or carboxyl groups, or the like, such, for example, as dihydric or polyhydric alcohols, polyglycols or polyesters having terminal hydroxyl or carboxyl groups.

There may also be incorporated with the hardenable compositions the usual additives, such as accelerators, for example, styrene oxide or organic peroxides, pigments, extenders or fillers. Examples of suitable extenders and fillers are asphalt, bitumen, glass fibers, mica, quartz meal, kaolin, or finely dispersed silicic acid (Aerosil). Thus, it may be of advantage to work up a solution in the cyclic ether or thioether of the complex of boron trifluoride and water or of the complex of boron trifluoride and a nitrogenous base in tetrahydrofurane with the inorganic filler to form a hardener paste, which shortly before use is mixed with the epoxide resin or with a mixture of the epoxide resin with the cyclic ether or thioether.

The compositions of the invention can be used for making rapidly hardening adhesives, laminating resins, lacquer coatings, casting resins and moulding compositions.

Compositions of the invention which contain in addition to pigments or fillers of all kinds such as finely dispersed silicic acid and also plasticizers are excellently suitable for use as filling compositions or putty-like masses.

The following examples illustrate the invention.

*Example 1*

100 grams of an epoxy resin which is liquid at room temperature and has been prepared in the known manner by alkaline condensation of 4:4'-dihydroxydiphenyl-dimethylmethane and epichlorhydrin, containing 5.1 epoxide equivalents per kg. are mixed with 50 grams of ditetrahydrofurfuryl phthalate (prepared by esterifying phthalic anhydride with tetrahydrofurfuryl alcohol). The resulting resin solution is mixed with a hardener solution of 1 gram of boron trifluoride dihydrate in 5 parts of tetrahydrofuran.

The resin+hardener mixture hardens at 20° C. after 1½ minutes with evolution of heat. The resulting casting possesses the following properties:

Impact bending strength _____ cm. kg./sq. cm__ 14.4
Bending strength _____ kg./sq. mm__ 10.3
Module of elasticity _____ 443
Martens value _____ ° C__ 51
Water absorption _____ percent__ 0.14

When a casting of 3 mm. thickness is extracted for 48 hours with boiling alcohol and then heated for 24 hours at 240° C., it loses 12.5% of its weight.

*Example 2*

A mixture of 100 grams of the liquid epoxy resin used in Example 1 (containing 5.1 epoxide equivalents per kg.) and 50 grams of ditetrahydrofurfuryl maleat is treated with a solution of 1 gram of boron trifluoride dihydrate in 5 grams of tetrahydrofurfuryl alcohol. This mixture hardens at room temperature within 5 minutes with evolution of heat. The resulting transparent casting possesses the following properties:

Impact bending strength _____ cm. kg./sq. cm__ 17.3
Bending strength _____ kg./sq. mm__ 10.3
Martens value _____ ° C__ 52
Absorption of cold water _____ percent__ 0.24

A casting (60 x 10 x 3 mm.), extracted for 48 hours with boiling alcohol and then heated for 24 hours at 240° C., loses 9.2% of its weight.

*Example 3*

50 grams of 2:6-ditetrahydrofurfuryl cyclohexanol-1 (obtained by catalytic hydrogenation with Raney nickel of the condensation product from 1 mol of cyclohexanone and 2 mols of furfural) are treated with a mixture of boron trifluoride dihydrate, 2 grams of butane-diol-1:4, 20 grams of titanium dioxide and 3 grams of finely dispersed silicic acid (trade name: Aerosil). The resulting paste is thoroughly mixed with 100 grams of a viscid epoxy resin obtained by alkaline condensation of 4:4'-dihydroxydiphenyl - dimethylmethane and epichlorhydrin (containing 4.6 epoxide equivalents per kg. of resin), and the resulting putty is spread over a piece of sheet aluminum. On being heated to 100° C., this mixture hardens within half a minute to form a hard, glossy, white mass. A foil made from this hardened mass, of 0.3 mm. thickness, extracted for 16 hours with cold acetone and then dried, loses 3.7% of its initial weight.

*Example 4*

2 grams of a solid boron trifluoride+aniline complex (molecular ratio BF$_3$:aniline=1:1) are dissolved in 40 grams of ditetrahydrofurfuryl formal. The resulting hardener solution is mixed with 100 grams of the liquid epoxy resin used in Example 1. The thinly liquid mixture is poured into an open mould and then hardened for ½ hour at 70° C. The resulting transparent casting has a Brinell hardness value of 15.1.

Example 5

76.8 grams of the epoxy resin used in Example 1 are intimately mixed with 40.0 grams of ditetrahydrofurfuryl phthalate and a solution of 2.66 grams of hydroxycyclohexyl hydroperoxide in 16.0 cc. of monomeric styrene, and this mixture is treated with 6.64 cc. of a solution of 5% by volume strength of boron trifluoride in tetrahydrofuran. After 2½ minutes, hardening sets in with strong evolution of heat and a casting is obtained which has the following properties:

Impact bending strength _____cm.kg./sq. cm__ 7.33
Bending strength _____kg./sq. mm__ 7.52
Absorption of cold water (4 days, 20° C.) percent__ 0.28
Martens value (DIN) _____° C__ 43

When the procedure described above is employed, except that a solution of 2.97 grams of hydroxycyclohexyl hydroperoxide in 32 cc. of monomeric styrene is used, the catalyst used being 7.44 cc. of a solution of 5% by volume strength of boron trifluoride in tetrahydrofurane, a casting is obtained which has the following properties:

Impact bending strength____ 16.29 cm. kg./sq. cm.
Bending strength _____ 5.17 kg./sq. mm. (no fracture at maximum deflection.)
Absorption of cold water (4 days, 20° C.) _____ 0.32%
Martens value (DIN)_____ Not measurable.

Example 6

A mixture of 50 grams of diethylene glycol diglycidyl ether and 50 grams of a viscous phenol novolac polyglycidyl ether (prepared from 1 mol of phenol, 0.5 mol of formaldehyde and 3 mols of epichlorohydrin) is mixed with 50 grams of ditetrahydrofurfuryl phthalate and 4 grams of boron trifluoride+monoethylamine complex. In a mould this mixture hardens at 120° C. within 12 hours to form a casting having a high impact bending strength and a Shore hardness of 81.

Example 7

A mixture of 75 grams of phthalic acid diglycidyl ester (trade name Metallon K; makers: Messrs. Henkel), 25 grams of ditetrahydrofurfuryl-endomethylene-tetrahydro phthalate and 4 grams of boron trifluoride+monoethylamine complex is hardened in a mould for 12 hours at 140° C. The resulting casting has a Shore hardness of 85.

Example 8

A liquid epoxy resin (containing 6.7 epoxide equivalents per kg.) is prepared by alkaline treatment of a condensation product from 1 mol of aniline and at least 2 mols of epichlorohydrin. 75 grams of this epoxy resin are mixed with 25 grams of ditetrahydrofurfuryl maleate and 4 grams of boron trifluoride+monoethyl-amine complex, and 75 grams of quartz powder are incorporated with this mixture as filler. The mass hardens at 140° C. to form a casting having a Shore hardness of 96.

Example 9

19.2 grams (0.1 mol) of trimellithic anhydride are reacted with 20.4 grams (0.2 mol) of tetrahydrofurfuryl alcohol. The ester formed is mixed with 3 grams of boron trifluoride+monoethylamine complex and the resulting paste is then mixed with 100 grams of 3:4-epoxy-6-methylcyclohexylmethyl-3:4-epoxy-6-methyl-cyclohexane carboxylate (trade name EP 201; made by Union Carbide). In a mould this mass hardens within 10 hours at 100° C. to form a casting having an impact bending strength of 1.0 cm. kg./sq. cm.

Example 10

15 grams of a viscous coumarone resin are mixed with 100 grams of the liquid epoxy resin used in Example 1 and with 4 grams of boron trifluoride+monoethylamine complex. The resulting mass is hardened for 12 hours at 150° C. in a mould, to form a solid casting having a Shore hardness of 97.

Example 11

30 grams of the epoxy resin described in Example 1 are mixed with 4 cc. of a 10% by volume solution of tin tetrachloride in ditetrahydrofurfuryl maleate and this mixture is made up to a total weight of 40 grams with ditetrahydrofurfuryl maleate. At room temperature a resin+hardener mixture is obtained which remains fit for use for about 2 minutes. In a mould the mixture hardens at room temperature with strong evolution of heat to form a hard, clear, pale-brown casting. When the mixture is poured over a pane of glass or over sheet aluminum and hardened for 4 hours at 120° C. a clear coating results which has a pendulum hardness according to Persoz of 362 for a coating 80μ thick (glass pane) and an Erichson value of 7.0 mm. (sheet aluminum).

When antimony pentachloride is used instead of tin tetrachloride, proceeding otherwise as described above, the resulting casting is likewise hard, clear and of brownish color, and respectively, a clear coating of considerable hardness and good elasticity.

Example 12

30 grams of the epoxy resin described in Example 1 are thoroughly mixed with a solution of 0.4 gram of zinc fluoborate in 10 grams of ditetrahydrofurfuryl maleate. A resin+hardener mixture is obtained which remains fit for use for one day at room temperature. In a mould the mass hardens at 120° C. within 15 minutes to form a hard, transparent casting of good impact strength. When the mixture is poured over a pane of glass and hardened for 4 hours at 120° C., a clear, colorless coating is obtained which, for a film thickness of 82μ, has a Persoz pendulum hardness of 351.

Example 13

By using 1:4-butanediol diglycidyl ether instead of the epoxy resin described in Example 1, proceeding otherwise as described in Example 12, a resin+hardener mixture is obtained which remains fit for use for 1 day. In a mould this mass hardens at 120° C. within 15 minutes to form a hard, transparent casting having good impact strength. When this mixture is poured over a pane of glass and hardened for 4 hours at 120° C., a clear, colorless coating is formed which, for a coating thickness of 153μ, has a pendulum hardness according to Persoz of 236.

Example 14

By using vinyl cyclohexene dioxide instead of the epoxy resin described in Example 1, proceeding otherwise as described in Example 12, a resin-hardener mixture is obtained which remains fit for use for 5 seconds. In a mould this mass hardens with strong evolution of heat to form a hard, transparent casting. A lacquer film 46μ thick, produced by pouring this mixture over a pane of glass and hardening for 4 hours at 120° C., has a pendulum hardness according to Persoz of 125 units.

Example 15

When the process described in Example 12 is carried out with tin fluoborate instead of with zinc fluoborate, a resin+hardener mixture is obtained which remains fit for use for 2 minutes; with iron fluoborate for 18 minutes; and with nickel fluoborate for 16 hours. To achieve hardening with lead fluoborate, the proportion thereof to be used must be four times that of the other specified metal fluoborates, and the resulting product remains fit for use for 24 hours.

When these mixtures are poured over panes of glass or sheet aluminum and hardened for 4 hours at 120° C., coatings are formed which have the following properties:

With tin fluoborate: pendulum hardness according to Persoz: 367 for a coating 78μ thick (glass); Erichson value: 4.5 mm. (sheet aluminum).

With iron fluoborate: pendulum hardness according to Persoz: 354 for a coating 80μ thick (glass); Erichson value: 8.0 mm. (sheet aluminum).

With nickel fluoborate: pendulum hardness according to Persoz: 352 for a coating 90μ thick (glass); Erichson value: 8.6 mm. (sheet aluminum).

With lead fluoborate: pendulum value according to Persoz: 345 for a coating 75μ thick (glass); Erichson value: 4.8 mm. (sheet aluminum).

What is claimed is:

1. The process for making a hardenable composition, comprising the steps of intimately mixing (1) a 1:2-epoxide compound having a 1:2-epoxide equivalency greater than 1 with (2) a five-membered cyclic compound of the formula:

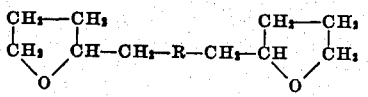

where R is selected from the group consisting of

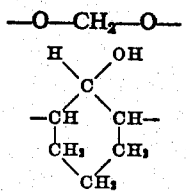

and bivalent organic radicals obtained by removing the terminal hydrogen atoms from two carboxylic groups of a polycarboxylic acid, in the presence of (3) a catalytic amount of a member selected from the group consisting of boron trifluoride, the fluoborates of zinc, tin, lead, iron, nickel, copper, cobalt, magnesium, cadmium, mercury, calcium, strontium, barium and aluminum, with the proviso that when boron trifluoride is employed, there is also employed (4) a complex-forming compound capable of forming a stable complex with boron trifluoride selected from the group consisting of water, ammonia, ethylamine, ethylenediamine, mono-ethanolamine, piperidine, triethanolamine, urea, hexamethylene tetramine, trimethylamine, pyridine, aniline, toluidine and Schiff's bases, about 0.2 to about 3.0 parts by weight of the complex-forming compound being employed for each part by weight of the boron trifluoride, and 5–50 parts by weight of (2) for every 100 parts by weight of (1).

2. A process according to claim 1, in which the five-membered cyclic compound (2) is ditetrahydrofurfurylphthalate.

3. A process according to claim 1, in which the five-membered cyclic compound (2) is ditetrahydrofurfurylmaleate.

4. A process according to claim 1, in which the five-membered cyclic compound (2) is dietetrahydrofurfurylformal.

5. A process according to claim 1, in which the 1:2-epoxide compound is a polyglycidyl ether of a polyhydric phenol.

6. A process according to claim 1, wherein there are employed 10–30 parts of (2) for every 100 parts by weight of (1).

7. A product produced by the process of claim 1.

References Cited in the file of this patent
UNITED STATES PATENTS

| | | |
|---|---|---|
| 2,717,885 | Greenlee | Sept. 13, 1955 |
| 2,886,472 | Condo et al. | May 12, 1959 |
| 2,993,915 | Luskin | July 25, 1961 |
| 3,025,307 | Garber et al. | Mar. 13, 1962 |

FOREIGN PATENTS

| | | |
|---|---|---|
| 898,269 | France | July 3, 1944 |

OTHER REFERENCES

Buttrey: "Plasticizers," 2nd Edition, page 26, Cleaver-Hume Press Ltd., London, 1957.